United States Patent Office 3,092,505
Patented June 4, 1963

3,092,505
REFRACTORY INSULATING AND SEALING COMPOUND
Raymond J. Demaison, Bronx, N.Y., assignor to Quigley Company, Inc., a corporation of New York
No Drawing. Filed Jan. 20, 1960, Ser. No. 3,497
4 Claims. (Cl. 106—99)

This invention relates to a method of producing a refractory insulating and sealing compound for high temperature use.

In the past there has been a great deal of work done toward developing a refractory insulating and sealing compound whose make up could be varied in order to meet a great number of conditions which are encountered in practice. In the normal use of such compounds, it is desirable to vary the operating temperatures, the shrinkage factors, the weight and even flexibility and compressibility but up to date this has been impossible.

The prime object of the present invention is to produce a refractory insulating and sealing compound in which the above properties may be varied at will by admixing two different ingredients to obtain the end results desired. A further object of the invention is to produce a refractory compound which may be mixed with water and applied on hot or cold surfaces in mastic form and either allowed to air dry or dry under direct or indirect heat. It is a further object of the invention to provide a refractory compound which may if desired even be sprayed.

The instant invention accomplishes the desired result by modifying a light weight fibrous porous plastic insulating refractory composition having a certain structural flexibility and compressibility, melting temperature, specific weight and shrinkage factor by the addition of varying amounts of solid refractory high temperature grains in finely divided form to produce a refractory compound of reduced structural flexibility and compressibility with a proportional increase in refractoriness. In saying an increase in refractoriness is accomplished, it is meant that higher melting temperatures are possible with lower shrinkage factors and also increased specific weight.

The basic material used in the instant invention is a light weight fibrous porous plastic insulating refractory composition which has a low thermal conductivity, but has high mechanical strength and will withstand high temperatures. This composition is light in weight, quick setting, may be applied to hot or cold surfaces and may be dried and set in the air or in heat as desired. In addition it has a normal shrinkage factor, is impervious to water, steam or air and contains no mineral wool or fine slag particles which are irritants of the skin.

The formulae of one light weight fibrous porous plastic insulating refractory composition is as follows:

*Example I*

(1) Mineral fibers 5 to 15%—preferably 9.7%
(2) Insulating porous particles 25 to 40%—preferably 32%
(3) White Portland cement 25 to 40%—preferably 30%
(4) Refractory plastic fireclay 20 to 35%—preferably 28%
(5) Aluminum powder 0.1 to 0.5%—preferably 0.3%

The above percentages are by weight.

The ingredients contained in the above refractory composition will now be disclosed in order to better understand the end results obtained.

(1) The mineral fibers are of suitable length to supply a certain amount of strength and flexibility as well as assist in insulation.

(2) The insulating porous particles are made by taking plastic fireclay and mixing it with fiberized paper, fine sawdust and water and formed into bricks which are then fired at 2500° F. to burn out the carbonaceous material mixed therein to result in a highly porous refractory weighing from 40 to 50#/cubic foot depending on the fineness and quantity of the fiberized paper and sawdust; the bricks are then crushed and ground to such fineness as to pass through a 20 mesh screen.

(3) The white Portland cement provides the binder needed to hold the mass in shape when set and in addition reacts with the aluminum in the manner indicated below.

(4) The refractory plastic fireclay provides the necessary plasticity and acts as a suspension agent for gunning and as a bonding and moisture retention agent for hot surface application.

(5) The aluminum powder in finely divided form reacts with the white Portland cement to release hydrogen bubbles and thus insures further lightness to the mass by the production and dispersion of air cells therein.

Another formulae which may also be used for the light weight porous plastic insulating refractory composition in which the action is more or less the same as above is as follows:

*Example II*

(1) Mineral fibers 15 to 30%—preferably 20%
(2) Refractory plastic fireclay 10 to 20%—preferably 13%
(3) White Portland cement 30 to 50%—preferably 40%
(4) Vermiculite (mica) 20 to 40%—preferably 27%

The above percentages are by weight.

The use of each one of the ingredients contained in this second example is the same as in the first example, except that the vermiculite (which is expanded mica) is used to take the place of the insulating porous particles.

The two refractory compositions disclosed above form the basis for the production of a refractory and sealing compound as now herein will be disclosed. In preferred form the refractory composition in Example I is used and to it are added in varying ratios from 3 to 1 to 7 to 1 any one of the solid high temperature refractories in fine grain form and water is added to this mixture to produce a suitable mastic mass for troweling or spraying as desired. Suitable solid high temperature refractories that may be used are dolomite, firebrick, aluminas, chromite, magnesite, etc. in a suitable finely divided form to produce grains which can and will mix with the light weight material to form a suitable mastic when mixed with water. The melting temperature of the solid high temperature refractories must be greater than that of the light weight composition, which temperatures in the present disclosure are 2200° F. for Example I and 1800° F. for Example II. The varying of the ratios of the solid high temperature refractories from 3 to 1 to 7 to 1 will give the results indicated in the following table:

|  | #1 | #2 | #3 | #4 | #5 |
|---|---|---|---|---|---|
| Light Weight Insulating Refractory Composition: |  |  |  |  |  |
| Example I (Parts) | 1 | 1 | 1 | 1 | 1 |
| Crome Ore (Parts) | 3 | 4 | 5 | 6 | 7 |
| Shrinkage, percent | 6.6 | 5.9 | 5.6 | 5.3 | 5.0 |
| Melting Temp. (°F.) | 2,500 | 2,550 | 2,580 | 2,615 | 2,635 |
| Wt., #/Cu. Ft. | 95 | 98 | 106 | 113 | 122 |

The melting temperature of the light weight insulating refractory composition in Example I is 2200° while the normal shrinkage factor of the composition is 15% and the weight is 36# per cubic foot. In addition, the structural flexibility and compressibility of the light weight fibrous porous insulating refractory composition will naturally be affected to result in a refractory compound of reduced structural flexibility and compressibility but with a proportionate increase in refractoriness as indicated in the above table. It will be also noted from the above table that, as the ratios are increased, the melting temperature rises as well as the weight per cubic foot and the shrinkage goes down. Therefore, by the simple expedient of varying the ratios of the two materials, a refractory inculating and sealing compound may be tailored to meet the individual problems encountered on each job.

It is of course understood that the above disclosure may be varied and still come within the scope of the invention.

What is claimed is:

1. A high temperature resisting lightweight refractory insulating and sealing compound adapted to be mixed with water, said refractory compound comprising a mixture of solid dense high temperature refractory grains in finely divided form and of a lightweight fibrous porous plastic insulating refractory composition, said porous refractory composition comprising 5 to 30% by weight of mineral fibers, 20 to 40% by weight of refractory insulating porous particles, and 25 to 50% by weight of hydraulic setting cement, said porous particles being in the form of large grain size aggregates of lighter weight than any of the other ingredients of said porous refractory composition, said mixture being composed of 1 part by weight of said porous refractory composition and 3 to 7 parts by weight of said solid dense high temperature refractory grains, the melting temperature of said solid dense high temperature refractory grains being substantially greater than that of the porous refractory composition.

2. A high temperature resisting lightweight refractory insulating and sealing compound according to claim 1, wherein the mineral fibers in said fibrous porous plastic insulating refractory composition are 5 to 15% by weight of said composition, the refractory insulating porous particles in said composition are 25 to 40% by weight of said composition, and the hydraulic setting cement is white Portland cement and is 25 to 40% by weight of said composition, and wherein said composition also comprises 20 to 35% by weight of refractory plastic fireclay and 0.1 to 0.5% of aluminum powder.

3. A high temperature resisting lightweight refractory insulating and sealing compound according to claim 1, wherein the mineral fibers in said fibrous porous plastic insulating refractory composition are 15 to 30% by weight of said composition, the refractory insulating porous particles in said composition constitute vermiculite and are 20 to 40% by weight of said composition and the hydraulic setting cement is white Portland cement and is 30 to 50% by weight of said composition, and wherein said composition also comprises 10 to 20% by weight of refractory plastic fireclay.

4. A high temperature resisting lightweight refractory insulating and sealing compound according to claim 1, wherein the solid dense high temperature refractory grains constitute a material of the class consisting of dolomite, alumina, chromite and magnesite.

References Cited in the file of this patent

UNITED STATES PATENTS

| | | |
|---|---|---|
| 1,163,060 | Atterbury | Dec. 7, 1915 |
| 2,084,232 | Williamson et al. | June 15, 1937 |
| 2,109,532 | Hill | Mar. 1, 1938 |
| 2,527,500 | Norton | Oct. 24, 1950 |
| 2,939,801 | McGillis et al. | June 7, 1960 |

FOREIGN PATENTS

| | | |
|---|---|---|
| 141,021 | Australia | May 1, 1951 |

OTHER REFERENCES

Zimmerman and Lavine, Handbook of Material Trade Names, 1953 edition, pub. Dover, N.H., page 299.